Jan. 19, 1960 J. W. LOY 2,921,969
PROCESS AND APPARATUS FOR CRYSTAL RECOVERY EMPLOYING
AN AUTOMATICALLY CONTROLLED CENTRIFUGE
Filed Sept. 12, 1955 2 Sheets-Sheet 1

INVENTOR.
J. W. LOY

BY *Hudson and Young*

ATTORNEYS

United States Patent Office 2,921,969
Patented Jan. 19, 1960

2,921,969

PROCESS AND APPARATUS FOR CRYSTAL RECOVERY EMPLOYING AN AUTOMATICALLY CONTROLLED CENTRIFUGE

John W. Loy, Bartlesville, Okla., assignor to Phillips Petroleum Company, a corporation of Delaware Application September 12, 1955, Serial No. 533,733

3 Claims. (Cl. 260—674)

This invention relates to crystal purification. In one of its more specific aspects the invention relates to an improved method of purifying crystals by centrifugation and to an improved centrifuge device for carrying out such process.

In the purification of various materials, particularly organic compounds, by crystallization methods some compounds can be obtained in a relatively pure form by a single crystallization from a mixture of compounds. Such method of purification is particulraly applicable to organic compounds, such as isomers, which have similar boiling points and solubilities and are therefore not readily separated by distillation or solvent extraction methods. Purification of materials by crystallization has one great advantage over other methods, such as distillation and solvent extraction, in that only one separation step is required to provide, theoretically at least, a pure product. Crystallization can be employed to separate many chemical compounds and isomers which can be separated by no other means and thus can be employed to purify many compounds which cannot economically be purified by other means. However, despite the fact that one stage of crystallization in certain cases, theoretically yields a pure product, attainment of this ideal has been difficult. Complete removal of liquid, occluded impurities without substantial loss in yield is required. Crystals which are formed and recovered from a crystallization step retain, in many cases, 50 percent by weight of occluded liquid impurities.

Separation of crystals from mother liquor by the application of centrifugal force has been employed but such method has also been susceptible to the problem of a film of mother liquor adhering to the surface of the crystals, even at high centrifuge speeds.

It is an object of this invention to provide an improved method for the purification of crystals resulting from a crystallization process.

It is also an object of this invention to provide an apparatus for continuous purification of crystals.

It is another object to provide a means for melting the surface of crystals and displacing the crystal melt with another liquid.

It is still another object to provide a means for removing occluded mother liquor from crystals by displacing same with another liquid.

Other objects and advantages, in addition to those hereinbefore set forth, will be apparent to one skilled in the art upon reading the accompanying description and particularly when considered in connection with the accompanying drawing.

I have found that crystal purification in a centrifuging process can be greatly improved by adding sufficient heat to the zone containing the separated crystals so as to melt a small portion of the crystal surface, thus providing a wash liquid to remove the occluded mother liquor, and by adding to the crystal-mother liquor, prior to or during centrifuging, a liquid which is relatively immiscible with the mother liquor and whose density differs from that of the mother liquor and approaches that of the crystals. This method is preferably utilized in a system wherein the crystals are more dense than the mother liquor and the immiscible liquid utilized is also more dense than the mother liquor. Heat is added to the periphery of the centrifuge bowl in an amount sufficient to melt the surface of the crystals and this melt together with the occluded mother liquor is then displaced by the more dense immiscible liquid.

As an example of the process of this invention the separation of para-xylene from a mother liquor containing ortho-, meta-, and para-xylene will be considered. There is a difference of approximately 0.1 in the specific gravity between the para-xylene crystals and mother liquor at $-100°$ F., the crystals exhibiting an apparent specific gravity of 1.047 and the mother liquor 0.9424. Ethyl acetate is a suitable material for this separation because its density approximates that of para-xylene crystals at $-100°$ F. and it is substantially immiscible with the mother liquor at that temperature. Other immiscible liquids include a mixture of ethyl alcohol and carbon tetrachloride, such as a solution approximately 11 mol percent carbon tetrachloride in alcohol. Various alcohols, ketones, and halogenated light hydrocarbons having the proper densities also can be utilized.

Figure 1:
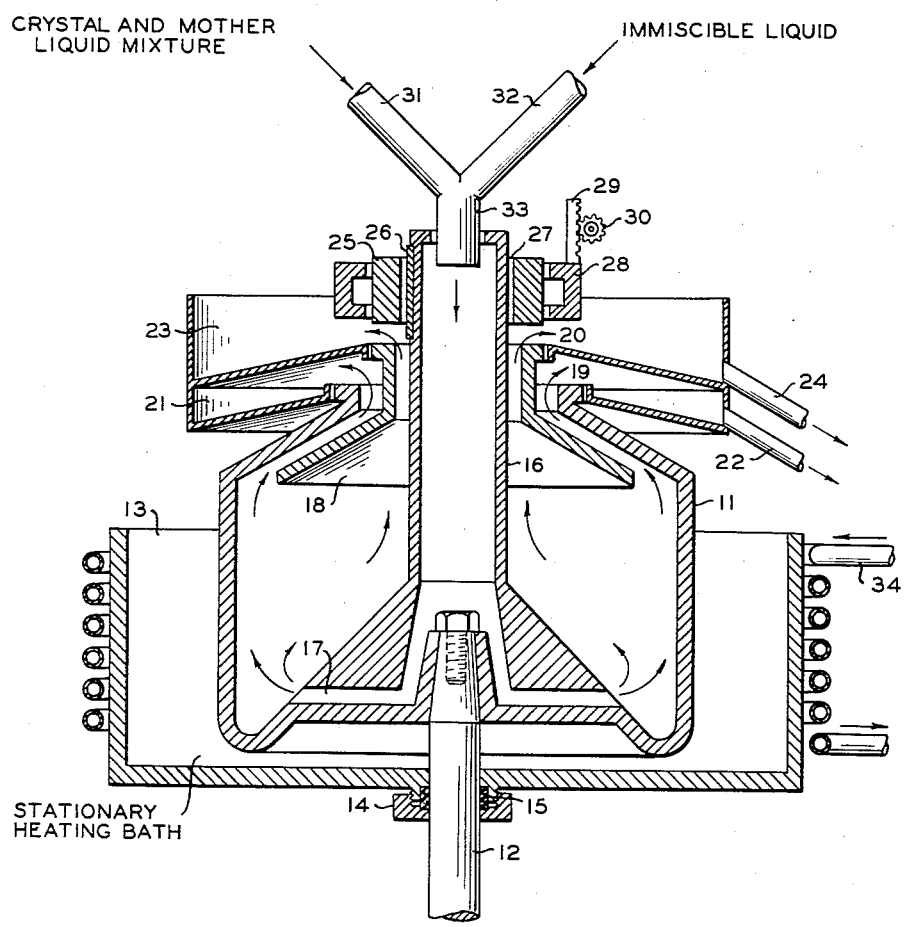
Figure 1 is a sectional, elevational view of an apparatus utilized for the continuous purification of crystals according to the invention.
Figure 2:
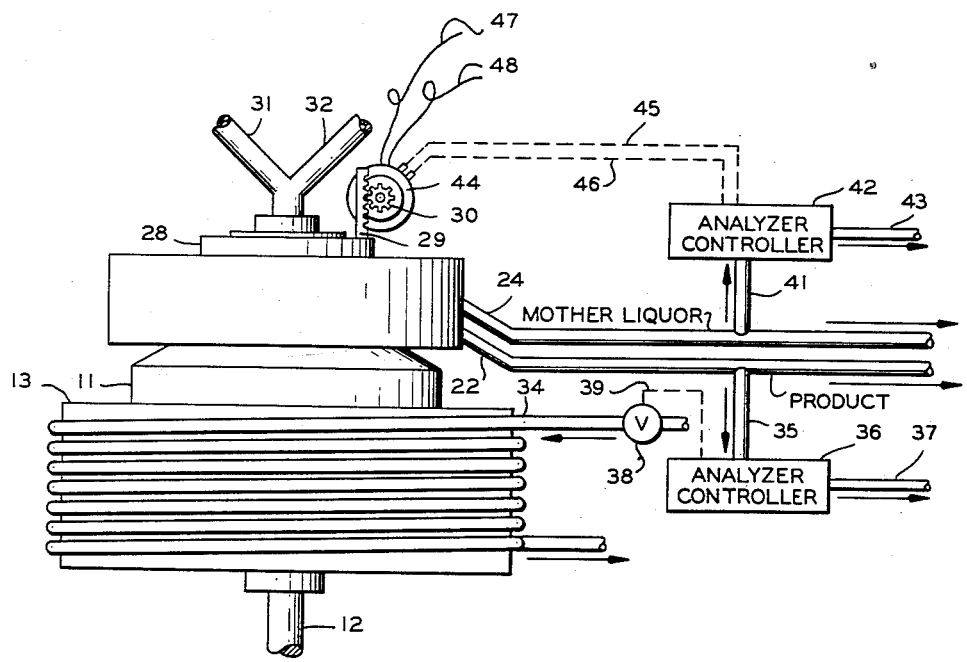
Figure 2 is an embodiment of the invention with automatic controls.

Referring now to Figure 1 of the drawing a centrifuge bowl 11 is shown secured to a rotatable shaft 12. Shaft 12 is seated in a bearing and equipped with a means, such as an electric motor, for rotation (not shown). Stationary heating bath 13 encircles bowl 11 and is supported by conventional support members (not shown). A stuffing box 14 containing packing 15 provides a seal between shaft 12 and bath 13. Bowl 11 contains a vertically disposed and centrally located conduit 16 which is closed at the bottom and open at the top. Passageways 17 communicate between the interior of bowl 11 and conduit 16. Separator plate 18 encircles conduit 16 so as to divide the annulus between the top of bowl 11 and conduit 16 into an outer annulus 19 and an inner annulus 20. Outer annulus 19 communicates with collecting chamber 21 and conduit 22 and inner annulus 20 communicates with collecting chamber 23 and conduit 24. Separator plate 18 is secured to conduit 16 and bowl 11 by spokes or stays (not shown). Collecting chambers 21 and 23 are stationary and are also supported by conventional support members (not shown). A ring 25, constructed of magnetic material, encircles conduit 16 above annulus 20 in vertical sliding communication with conduit 16. Ring 25 is caused to rotate with conduit 16 by a key 26 and seat 27 arrangement. A magnet 28 partially encircles ring 25 and out of physical contact with ring 25. Magnet 28 is raised and lowered by means of rack 29 and pinion 30. Magnet 28 can be a permanent magnet or an electromagnet.

Raising and lowering the ring 25 varies the effective area of annulus 20 and thus serves to control the ratio of material passing through annulus 19 relative to that passing through annulus 20.

Feed to the centrifuge is introduced through lines 31 and 32 and through line 33 to the interior of conduit 16.

The bath 13 can be heated by any suitable means such as coil 34 through which is circulated a heating fluid.

In the operation of the centrifuge according to the process of this invention the crystals and the immiscible liquid are carried to the periphery of the imperforate centrifuge bowl and the lighter mother liquor accumulates at the axis of the bowl. The amount of immiscible liquid will be at least sufficient to form a fluid slurry with said crystals. The addition of a small amount of heat will then melt the surface of the crystals suspended in the immiscible liquid causing the surface of each crystal to slough off the adhering film of mother liquor and this melted film of crystal together with the film of mother liquor will be displaced by the immiscible liquid and caused to migrate to the axis of the centrifuge bowl. The slurry recovered from the peripheral section of the centrifuge will then be composed of immiscible liquid and crystals which have been freed of mother liquor. In order to prevent the inclusion of any of the mother liquor phase in the heavy slurry stream it is usually desirable to regulate the drawoff of mother liquor at the axis outlet of the centrifuge bowl so as to include a small portion of the slurry of immiscible liquid and crystals in that stream. The immiscible liquid can then be recovered from the mother liquor and recycled to the centrifuge.

A preferred method for controlling the amount of crystal surface melted is by continuous analysis of the crystal product after melting and by controlling the heat in accordance with the results of such analysis. The analyzer can be a refractometer such as is described by Miller, Crawford, and Simmons in Analytical Chemistry, vol. 24, No. 7, page 1087. The analyzer can be connected to a conventional temperature controller which can be used to control the amount of heat added to the stationary heat bath 13.

The rate of mother liquor withdrawal from the centrifuge can also be automatically controlled by using a similar analyzer to analyze this stream for immiscible liquid and this analyzer used to regulate the rate of mother liquor withdrawal by the proper positioning of magnet 28.

A product sample stream is taken from conduit 22, passed via conduit 35 through analyzer controller 36 and removed via conduit 37. Analyzer controller 36 is connected to valve 38 by means of linkage 39 so as to control the amount of heating fluid passing through coil 34.

A mother liquor sample stream is taken from conduit 24, passed via conduit 41 through analyzer controller 42 and removed via conduit 43. Analyzer controller 42 is connected to servomotor 44 by means of leads 45 and 46 for proper positioning of magnet 28. Leads 47 and 48 connect servomotor 44 to a power source (not shown).

The operation of the described apparatus used in the practice of this invention will be best illustrated by the example hereinafter set forth. A crystal slurry containing 14 weight percent para-xylene crystals and 86 weight percent mother liquor in which the crystals were obtained by chilling a feed solution to about −100° F. is fed to the centrifuge through line 31 at a rate of 100 lbs. per hour and ethyl acetate at a temperature of −100° F. is fed through line 32 at a rate of 36 lbs. per hour. These materials are maintained at this temperature in the centrifuge with the exception of the periphery of the centrifuge bowl which is heated by the stationary heat bath sufficiently to melt the surface of the crystals at the rate of approximately 2 lbs. per hour of crystals at or near the periphery of the bowl. Ring 25 is adjusted vertically so as to remove 90 lbs. per hour of liquid through annulus 20 and conduit 24. Forty-six lbs. per hour of slurry composed of 34 lbs. of ethyl acetate and 12 lbs. of crystals are removed through annulus 19 and conduit 22. The slurry of ethyl acetate and crystals is resolved, upon melting of the crystals, into two immiscible liquids so that para-xylene can be easily separated from the ethyl acetate in the form of para-xylene of approximately 99.1 percent purity.

This invention is applicable to the separation of liquid mixtures, the components of which have practically the same boiling point and are, therefore, difficult to separate by fractional distillation, or to mixtures which have diverse boiling points but which form azeotropes or are heat sensitive. The effective separation of components of such mixtures may be made from systems where the concentration of one component is relatively high, such as 97 or 98 percent, or where the concentrations of the components are about equal. One particular advantageous application of the process lies in the purification of a component of, say 50 to 60 percent purity, so as to effect a purity upwards of 98 percent. In order to illustrate some of the systems to which the invention is applicable, the following compounds are grouped with respect to their close boiling points:

| Group A | B.P.,°C. | F.P.,°C. |
|---|---|---|
| Benzene | 80 | 5.5 |
| n-Hexane | 69 | −94 |
| n-Heptane | 98.52 | −90.5 |
| Carbon tetrachloride | 77 | −22.8 |
| Acrylonitrile | 79 | −82 |
| Ethyl alcohol | 78.5 | −117.3 |
| 2,2-Dimethylpentane | 79 | −125 |
| 3,3-Dimethylpentane | 86 | |
| Methyl ethyl ketone | 79.6 | −86.4 |
| Methyl propionate | 79.9 | −87.5 |
| Methyl acrylate | 80.5 | |
| 1,3-Cyclohexadiene | 80.5 | −98 |
| 2,4-Dimethylpentane | 80.8 | −123.4 |
| 2,2,3-Trimethylbutane | 80.9 | −25 |
| Cyclohexane | 81.4 | 6.5 |
| Acetonitrile | 82 | −42 |
| Cyclohexane | 83 | −103.7 |
| 2-Methylhexane | 90 | −119 |
| 3-Methylhexane | 89.4 | −119.4 |

| Group B | B.P.,°C. | F.P.,°C. |
|---|---|---|
| Methyl cyclohexane | 100.3 | −126.3 |
| Cyclohexane | 81.4 | 6.5 |
| n-Heptane | 98.52 | −90.5 |
| 2,2,4-Trimethylpentane (isooctane) | 99.3 | −107.4 |
| Nitromethane | 101 | −29 |
| p-Dioxane | 101.5 | 11.7 |
| 2-Pentanone | 101.7 | −77.8 |
| 2-Methyl-2-butanol | 101.8 | −11.9 |
| 2,3-Dimethylpentane | 89.4 | |
| 3-Ethylpentane | 93.3 | −94.5 |

| Group C | B.P.,°C. | F.P.,°C. |
|---|---|---|
| Toluene | 110.8 | −95 |
| Methylcyclohexane | 100.3 | −126.3 |
| 2,2,3,3-Tetramethyl butane | 106.8 | 104 |
| 3,5-Dimethylhexane | 108.25 | −91 |
| 2,4-Dimethylhexane | 110 | |
| 2,3-Dimethylhexane | 113.9 | |
| 3,4-Dimethylhexane | 116.5 | |
| 3-Ethyl-2-methylpentane | 114 | |
| 3-Ethyl-3-methylpentane | 119 | |

| Group D | B.P.,°C. | F.P.,°C. |
|---|---|---|
| Aniline | 184.4 | −6.2 |
| Toluene | 110.8 | −95 |
| Benzene | 80.0 | 5.5 |

| Group E | B.P.,°C. | F.P.,°C. |
|---|---|---|
| Carbon tetrachloride | 77 | −22.8 |
| Chloroform | 61 | −63.5 |
| CS₂ | 46.3 | −108.6 |
| Acetone | 56.5 | −95 |

| Group F | B.P.,°C. | F.P.,°C. |
|---|---|---|
| Ortho-xylene | 144 | −27.1 |
| Meta-xylene | 138.8 | −47.4 |
| Para-xylene | 138.5 | 13.2 |

| Group G | B.P.,°C. | F.P.,°C. |
|---|---|---|
| Ortho-cymene | 175.0 | −73.5 |
| Meta-cymene | 175.7 | <−25 |
| Para-cymene | 176.0 | −73.5 |

Systems consisting of any combination of two or more of the components within any one of the groups may be separated by the process of the invention, as well as systems made up of components selected from different groups; for example, benzene may be separated from a benzene-n-hexane or n-heptane system in which the benzene is present in an amount greater than the eutectic concentration. In the same manner, para-xylene may be readily separated from a mixture of para- and meta-xylenes or from para-, meta-, and ortho-xylenes. Benzene may also be separated from a mixture of toluene and/or aniline. Multi-component systems which may be effectively separated so as to recover one or more of the components in substantially pure form include 2,2-dimethylpentane, 2,4-dimethylpentane, 2,2,3-trimethylbutane, methyl cyclohexane, 2,2,4-trimethylpentane, and carbon tetrachloride, chloroform, and acetone. The invention is also applicable to the separation of individual components from a system of cymenes and a system including the xylenes.

Variations and modifications are possible within the scope of the disclosure of the invention, the essence of which is the addition, to a slurry of crystals and mother liquor, of an immiscible liquid whose density differs from that of the mother liquor and approximates that of the crystals; centrifuging a resulting mixture; and heating the crystal-immiscible liquid phase so as to melt the surface of the crystals whereby the adhering film of mother liquor is removed from the crystals and displaced by the immiscible liquid.

What is claimed is:

1. A process for the recovery of para-xylene from a mixture comprising isomeric alkyl benzenes and including said para-xylene, which comprises cooling said mixture and forming therein crystals of para-xylene; admixing said para-xylene and accompanying mother liquor with sufficient cold ethyl acetate to form a fluid slurry of crystals and ethyl acetate; centrifuging the resulting mixture in an imperforate centrifuging zone; adding sufficient heat to said para-xylene crystals in said centrifuging step so as to melt only the surface of the crystals; and withdrawing from said centrifuging step a slurry of ethyl acetate and para-xylene crystals freed of mother liquor.

2. A centrifuging apparatus comprising an imperforate bowl; a peripheral annulus for recovery of a heavy stream; a center feed inlet conduit; a separator plate encircling and spaced from said center feed inlet conduit to form an axial annulus for recovery of a light stream; a ring of magnetic material encircling said feed inlet conduit in vertical, sliding engagement with said conduit above said axial annulus; a magnet positioned in magnetic relationship with said ring; means to raise and lower said magnet thereby raising and lowering said ring so as to vary the area of said axial annulus; heating means for heating the periphery of said bowl; analyzer means for determining the purity of product recovered in said heavy stream; and temperature controller means operatively connected to said heating means and to said analyzer means to vary the heat supplied in response to the purity of the product in the heavy stream.

3. A centrifuging apparatus comprising an imperforate bowl; a peripheral annulus for recovery of a heavy stream; a center feed inlet conduit; a separator plate encircling and spaced from said center feed inlet conduit to form an axial annulus for recovery of a light stream; a ring of magnetic material encircling said feed inlet conduit in vertical, sliding engagement with said conduit above said axial annulus; a magnet positioned in magnetic relationship with said ring; means to raise and lower said magnet thereby raising and lowering said ring so as to vary the area of said axial annulus; first analyzer means for determining the amount of heavy material contained in said light stream recovered from said axial annulus; controller means operatively connected to said magnet and said first analyzer to vary the area of said axial annulus in response to the quantity of heavy material in said light stream; heating means for heating the periphery of said bowl; second analyzer means for determining the purity of product recovered in said heavy stream; and temperature controller means operatively connected to said heating means and to said second analyzer means to vary the heat supplied in response to the purity of the product in the heavy stream.

References Cited in the file of this patent

UNITED STATES PATENTS

| | | |
|---|---|---|
| 1,571,943 | Hall et al. | Feb. 9, 1926 |
| 1,782,028 | Burch | Nov. 18, 1933 |
| 2,696,307 | Rush | Dec. 7, 1954 |
| 2,724,007 | Tegge | Nov. 15, 1955 |
| 2,750,433 | LeTourneau et al. | June 12, 1956 |

FOREIGN PATENTS

| | | |
|---|---|---|
| 717,147 | Great Britain | Oct. 20, 1954 |